W. J. BERNTHOLD.
ENVELOP.
APPLICATION FILED APR. 15, 1908.
904,751.
Patented Nov. 24, 1908.
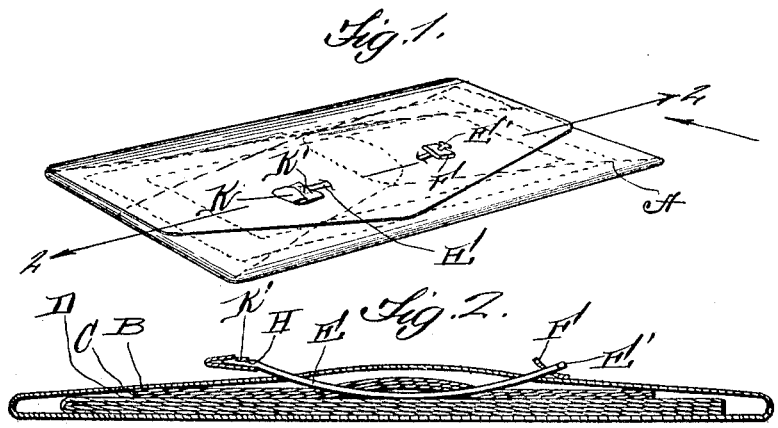
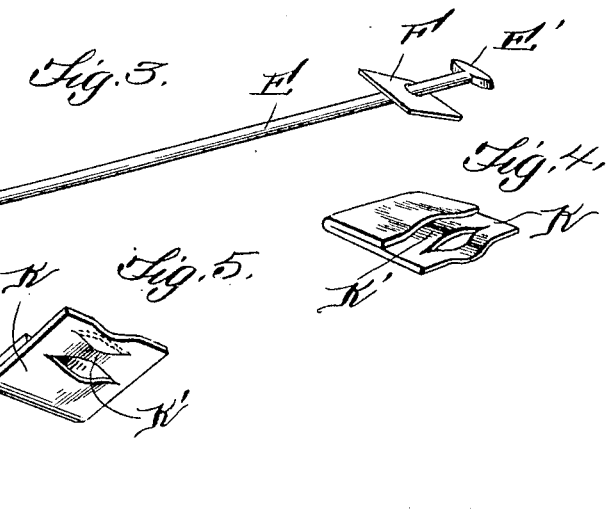
Witnesses
Inventor
William J. Bernthold
By Franklin H. Hough
Attorney

UNITED STATES PATENT OFFICE.

WILLIAM J. BERNTHOLD, OF NEAR PORTSMOUTH, OHIO.

ENVELOP.

No. 904,751.   Specification of Letters Patent.   Patented Nov. 24, 1908.

Application filed April 15, 1908. Serial No. 427,235.

*To all whom it may concern:*

Be it known that I, WILLIAM J. BERNTHOLD, a citizen of the United States, residing near Portsmouth, in the county of Scioto and State of Ohio, have invented certain new and useful Improvements in Envelops; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in safety envelops and means for securely sealing the same, and comprises various details of construction, combinations and arrangements of parts which will be hereinafter fully described and then specifically defined in the appended claim.

My invention is illustrated in the accompanying drawings, in which:—

Figure 1 is a perspective view of an envelop showing a sealing pin holding the flaps thereof. Fig. 2 is a sectional view on line 2—2 of Fig. 1. Fig. 3 is an enlarged detail view of the sealing pin. Figs. 4, 5 and 6 are details of the pin and locking feature thereof.

Reference now being had to the details of the drawings by letter, A designates an envelop, the flaps of which are made preferably as shown in dotted outline in Fig. 1 of the drawings and in the manner shown in solid lines when folded. Positioned within the envelops are cards or slips, designated by letters B, C and D, upon which the address of the person sending the letter may be written if desired, in order to identify the sender. After the flaps of the envelop have been sealed a sealing pin E is passed through the flap of the envelop through the card, B, C and D, as shown clearly in Fig. 2 of the drawings. One end of said pin has a head E', and F is a flexible washer mounted upon said pin near its head. Near the free end of the pin is a notch H, and K is a retaining cap, having a strap K' struck up therefrom and formed of resilient metal adapted to spring into the notch H when said cap is slipped over the end of the pin in the manner shown in Figs. 2 and 4, thereby forming means for securely holding the pin in place.

From the foregoing, it will be noted that, by the provision of the means described, an efficient mechanism is afforded whereby the tampering with the contents of an envelop may be readily detected.

What I claim to be new is:—

A sealing device for envelops comprising, in combination with a folded blank of an envelop, a pin passing through the flaps of the envelop and the contents of the latter, said pin provided with a head at one end and having its other end pointed with a notch adjacent thereto, a flexible washer upon said pin adjacent to its head, a cap made of a sheet of metal bent upon itself to form a socket portion and having a projecting end, transverse slits forming a strap, said point adapted to be inserted through said slits and into the socket with said strip seated in the recess in the pin, as shown and described.

In testimony whereof I hereunto affix my signature in the presence of two witnesses.

WILLIAM J. BERNTHOLD.

Witnesses:
 MATTIE R. TURNER,
 ARTHUR L. MARTIN.